United States Patent [19]

Inoue

[11] 3,901,343

[45] Aug. 26, 1975

[54] VEHICLE POWER STEERING CONTROL SYSTEM

[75] Inventor: Naohiko Inoue, Yokohama, Japan

[73] Assignee: Nissan Motor Company Limited, Yokohama, Japan

[22] Filed: Nov. 9, 1973

[21] Appl. No.: 414,407

[30] Foreign Application Priority Data

Nov. 15, 1972 Japan.............................. 47-113845

[52] U.S. Cl................................ 180/79.2 R; 91/450
[51] Int. Cl.².......................................... B62D 5/08
[58] Field of Search........... 180/79.2 R; 91/450, 449

[56] References Cited

UNITED STATES PATENTS

| 3,011,579 | 12/1961 | Milliken et al. | 180/79.2 R |
| 3,564,975 | 2/1971 | Moran | 91/450 |

*Primary Examiner*—David Schonberg
*Assistant Examiner*—John A. Pekar

[57] ABSTRACT

A hydraulic pressure control valve for use in a power-assisted steering system of a motor vehicle, which regulates the level of hydraulic pressure in a power chamber of a power steering unit in dependence on vehicle speed and road gradient on which the motor vehicle travels.

5 Claims, 4 Drawing Figures

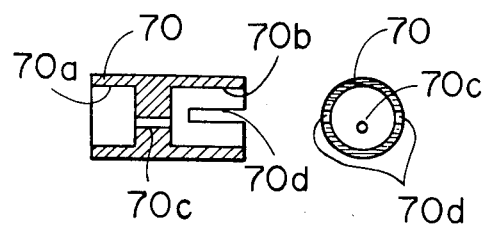
*Fig. 2A*   *Fig. 2B*
*Fig. 3*
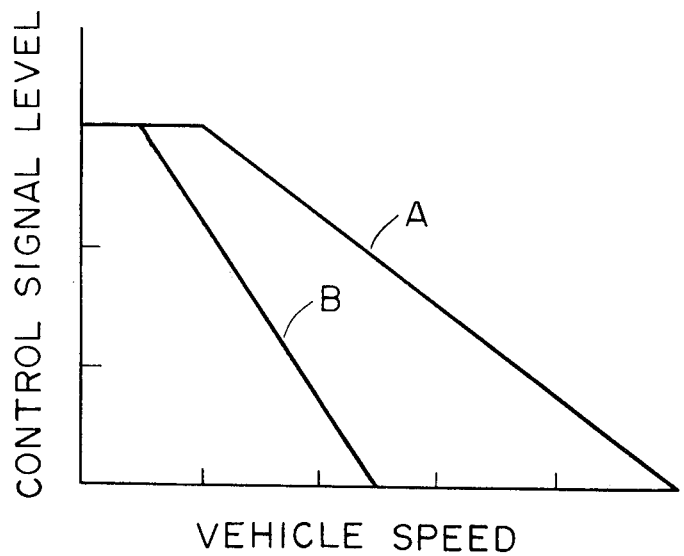

VEHICLE POWER STEERING CONTROL SYSTEM

This invention relates to a power steering control system for a motor vehicle, and, particularly, to a fluid pressure control valve for use in a power-assisted steering control system for a motor vehicle.

It has heretofore been proposed to have a motor vehicle equipped with power-assisted steering control system by which steering assistance is provided to reduce driver effort required for steering the motor vehicle. Difficulties are encountered in prior art power-assisted steering control systems in that oversteering frequently occurs due to the inherent construction at high speeds or moving downhill. To overcome these difficulties, various attempts have been made. However, none of these attempts have proven satisfactory in practical use because of complicated configuration and high cost.

It is, therefore, an object of the present invention to provide a power-assisted steering control system which overcomes the above-mentioned shortcomings.

It is another object of the present invention to provide a power-assisted steering control system for a motor vehicle, which operates reliably under all operating conditions of the motor vehicle.

It is another object of the present invention to provide a power-assisted steering control system for a motor vehicle, which provides completely stable power-assisted steering.

It is a further object of the present invention to provide a power-assisted steering control system for a motor vehicle by which oversteering at high speed or moving downhill is eliminated.

It is a still further object of the present invention to provide a power-assisted steering control system for a motor vehicle, which is simple in construction and inexpensive to manufacture.

These and other objects, features and advantages of the present invention will become more apparent from the following description taken in conjunction with the accompanying drawings, in which:

FIG. 1 is a schematic sectional view of a preferred embodiment of a power-assisted steering control system incorporating a fluid pressure control valve according to the present invention;

FIGS. 2(A) and (B) are enlarged sectional views showing an element of the system of FIG. 1;

FIG. 3 is a graph showing the relationship between vehicle speed and the level of a control signal generated by an electrical computing means forming part of the power-assisted steering control system shown in FIG. 1;

Figure 1:
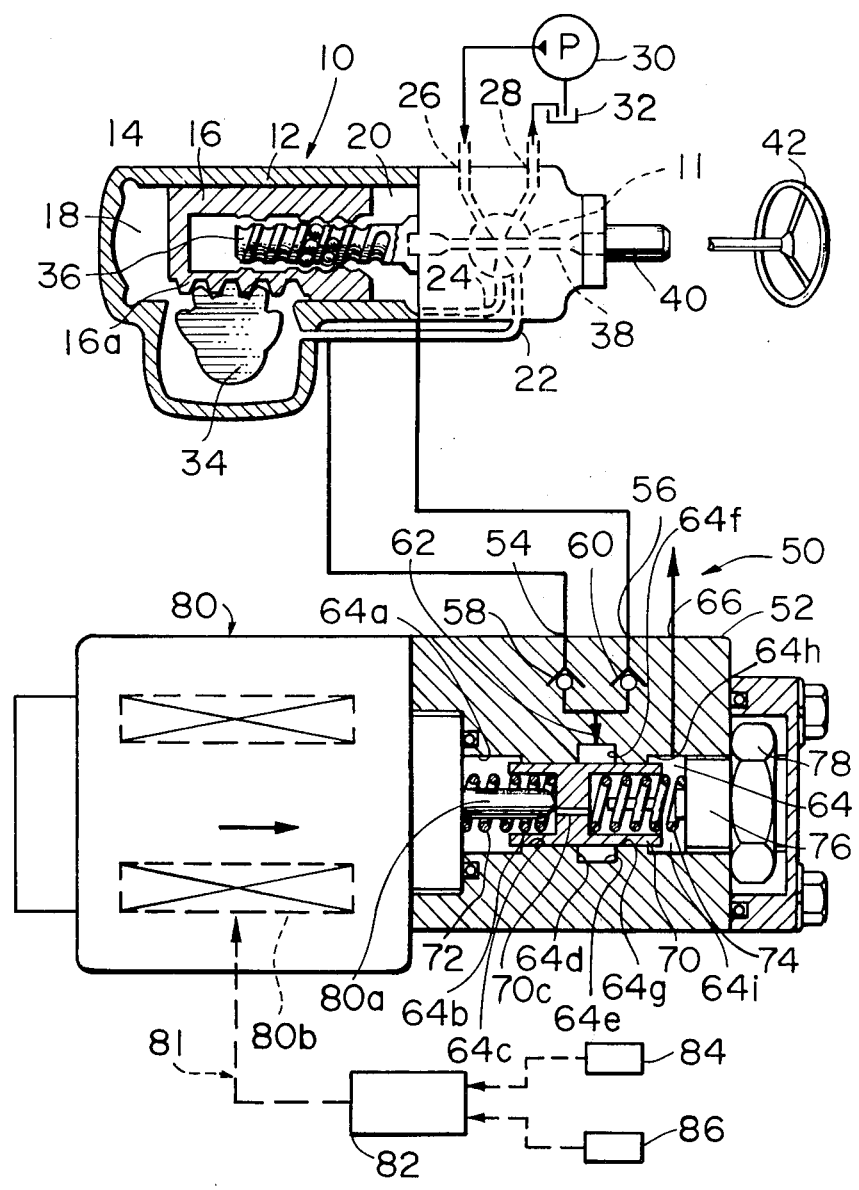

Referring now to FIG. 1, there is schematically shown a preferred embodiment of a power-assisted steering control system for a motor vehicle according to the invention. As shown, the power-assisted steering control system has a steering gear 10 including a casing 12. The casing 12 has formed therein a chamber 14 in which a power piston 16 is axially slidably disposed. The power piston 16 divides the chamber 14 into first and second power chambers 18 and 20. The first power chamber 18 communicates with a passageway 22, while the second power chamber 20 communicates with a passageway 24. The passageways 22 and 24 can be selectively brought into fluid communication with an inlet 26 and at outlet 28, respectively, by means of a rotary valve 11. The inlet 26 is connected to a source of pressurized hydraulic fluid such as an engine driven pump 30, whereas the outlet 28 is connected to an unpressurized fluid reservoir 32.

As shown, the power piston 16 is a ball nut formed with a rack 16a, with which a sector gear 34 meshes. A worm 36 drives the piston 16 through balls (no numerals). The worm shaft 36 is mechanically connected to a torsion bar 38, which in turn is mechanically connected through a steering column 40 to a steering wheel 42 of the vehicle. The torsion bar 38 actuates the valve 11 in a well known manner, and the power piston 16 acts as a fluid operated steering assistance actuator.

With the arrangement described hereinabove, the pump 30 is driven by a vehicle engine and supplies hydraulic fluid under pressure at a constant flow rate to the steering gear 10. If the steering wheel 42 is turned, the valve 11 is actuated to supply hydraulic fluid under pressure $P_p$ depending on the twisting angle of the torsion bar 38 into one of the first or second power chambers 18 and 20 in dependence on the direction of turning of the steering wheel 42. Hydraulic fluid under the pressure $P_p$ supplied into the first or second power chamber 18 or 20 acts on the power piston 16 to overcome the resistance of the vehicle wheels to the steering operation.

The present invention controls the level of the hydraulic fluid under pressure supplied into the first or second power chamber 18 or 20 in dependence on various operating conditions of the vehicle to provide proper power steering assistance throughout all operating conditions of the vehicle. To carry out this concept, the present invention provides a hydraulic fluid pressure control valve in the power-assisted steering control system.

The hydraulic fluid pressure control valve 50 includes a valve body 52 having first and second inlets 54 and 56 which are in communication with the first and second power chambers 18 and 20, through first and second check valves 58 and 60 respectively, which are disposed in the valve body 52. The first and second check valves 58 in turn communicate through a main port 62 with a fluid chamber or bore 64 formed in the valve body 52. The bore 64 is symmetrical about its longitudinal axis and is stepped to provide axially adjacent bore portions of different cross-sectional area with shoulders between the bore portions. These bore portions and shoulders include bore portions 64a, 64c, 64e, 64g and 64i, and annular radial shoulders 64b, 64d, 64f and 64h. The bore 64 provides fluid communication between the main port 62 and a drain 66 which is formed in the valve body 52 and which is connected to the fluid reservoir 32. The degree of fluid communication between the main port 62 and the drain 66 is modulated by a movable flow control member in the form of a valve spool 70.

The valve spool 70 is axially slidably disposed in the bore 64. As best shown in FIGS. 2(A) and (B), the valve spool 70 is formed with first and second cavities 70a and 70b, between which an axially extending bore 70c is formed as a damping means for the valve spool 70. As shown, the valve spool 70 also has at least one axially extending slot 70d. Upon axial movement of the valve spool 70, fluid flow through the valve 50 depends on the effective cross-sectional areas of the portions of the slots 70d extending to the left of the annular radial shoulder 64f as shown, and the flow rate of hydraulic fluid under pressure drained out through the drain 66 thus depends on the axial position of the valve spool 70 with respect to the annular radial shoulder 64f.

As shown in FIG. 1, the valve spool 70 is held in a balanced or rest position by a pair of compression springs 72 and 74 disposed in the first and second cavities 70a and 70b, respectively. The rest position of the valve spool 70 is set by an adjusting screw 76 received in the bore portion 64i. The adjusting screw 76 is locked with respect to the valve body 52 by a lock nut 78.

Figure 5:
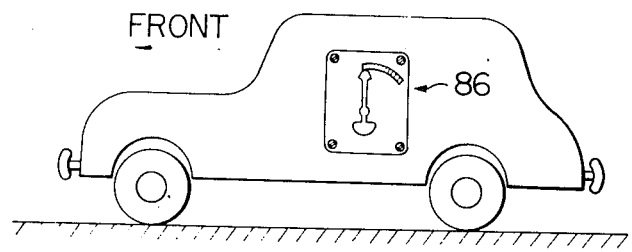
FIG. 5 is a schematical view of a road gradient sensor mounted on a side portion of the vehicle body.
Figure 6:
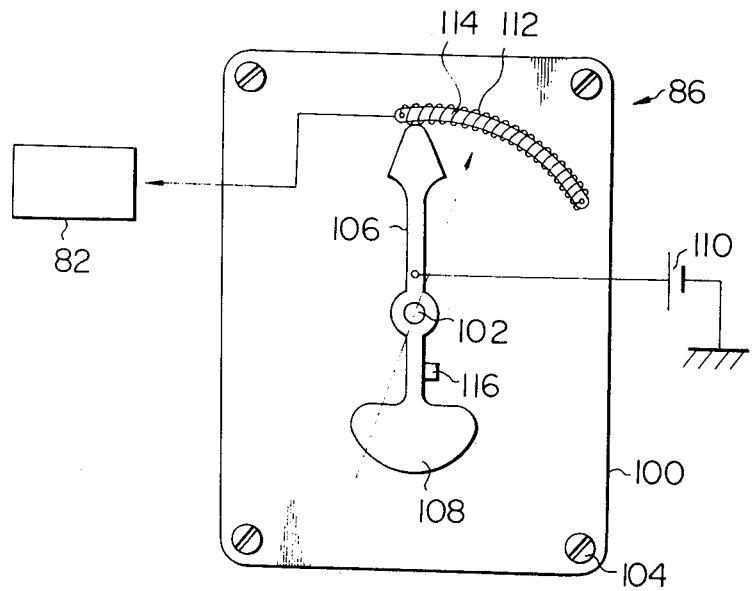
FIG. 6 is an enlarged elevational view of the road gradient sensor shown in FIG. 5.

Indicated as 81 is an electrical actuator which comprises a solenoid 80 having a mechanical actuating member or plunger 80a cooperating with one end of the valve spool 70 and a solenoid coil 80b. The solenoid coil 80b is electrically connected to an electrical computing means 82, which in turn is electrically connected to a vehicle speed sensor 84 and a road gradient sensor 86. The vehicle speed sensor 84 senses the vehicle speed and produces an first electrical signal in dependence thereon, while the road gradient sensor 86 senses the gradient of the road surface on which the vehicle is located and produces a second electrical signal in dependence thereon. The road gradient sensor 86 is mounted on a vehicle body in a vertical position as schematically shown in FIG. 5. The gradient sensor 86 comprises a base plate 100 fixed onto a side body portion of the vehicle by means of bolts 105. A swingable arm 106 is pivotally supported at the generally intermediate portion thereof by means of a pivot 102 fixedly connected to a generally central portion of the base plate 100. The swingable arm 106 has a weight portion 108 at the lower and thereof to be preferably swung and is electrically connected to a electrical power source such as a 12V DC car battery 110. A coil 112 having therein an insulating core 114 is arranged on the upper portion of the base plate 100 in such a manner that the upper end of the swingable arm 106 slidably electrically contacts with the coil 112. One end of the coil 112 is connected to the electrical computing means 82.

In the construction described above, when the vehicle is inclined on a downhill, the swingable arm 106 is rotated clockwise as indicated in phantom line, so that the electrical resistance between the swingable arm 106 and the computing means 82 is increased. On the contrary, when the vehicle is inclined on an uphill, the swingable arm 106 is prevented from the counterclockwise movement by means of a stopper 116, so that the electrical resistance does not change. As a result of this fact, the current is reduced only when the vehicle runs down a hill. Gradient sensors using the idea of a swingable arm as part of an electrical transducer in the sensor have been known for some time and one such example is shown in the U.S. Pat. to Shea 3,029,716, issued on Apr. 17, 1962. These electrical signals are fed into the means 82, which modifies and amplifies the signals and generates an appropriate control signal which is applied to the solenoid coil 80b. It should be noted that the solenoid 80 is arranged to move the valve spool 70 in accordance with the level of the control signal from the means 82 to vary the effective cross-sectional area of the slots 70d so that the pressure of the hydraulic fluid in the first or second power chamber 18 or 20 of the steering gear 10 is modulated in dependence on the vehicle speed and the road gradient.

In FIG. 3, there is shown an example of the relationship between the vehicle speed and the control signal level. When the motor vehicle is on a level road, the control signal level varies as shown by a solid line A, whereas, when the motor vehicle is moving downhill, or on a negative gradient, the control signal level varies as shown by a solid line B in FIG. 3. It will be seen that the level of the control signal decreases as the vehicle speed increases, and further decreases if the vehicle is moving downhill.

Figure 4:
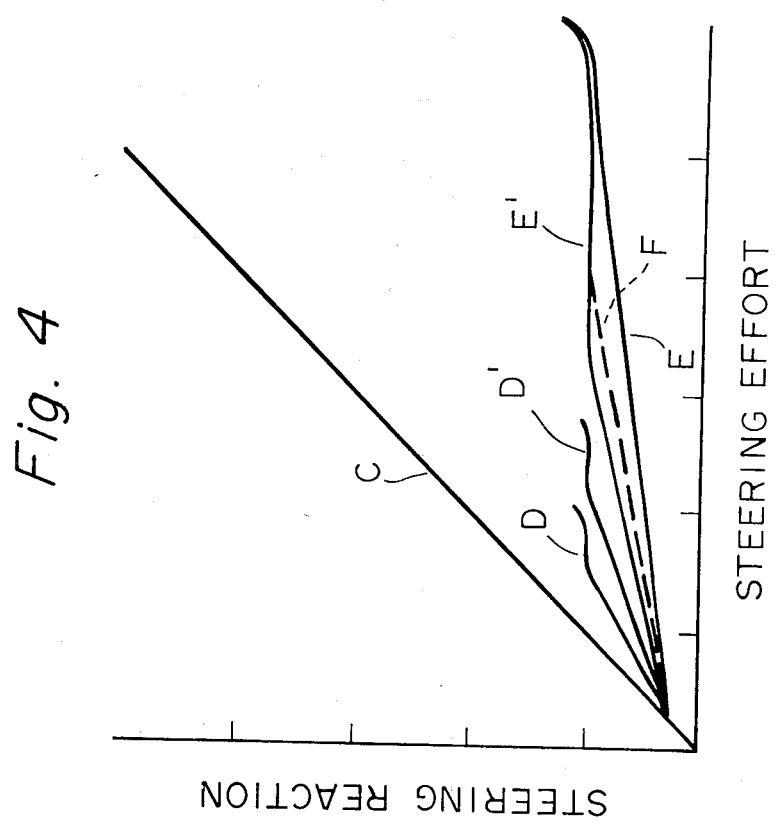
FIG. 4 is a graph showing the relationship between the steering reaction and the steering effort attained by the power-assited steering control system shown in FIG. 1.

FIG. 4 illustrates the relationship between the steering effort and the steering reaction, In FIG. 4, a solid line C represents the relationship achieved by a conventional manual steering system. Curves D and E represent the relationship achieved by a system of the invention at high and low vehicle speeds respectively on a level road, and curves D' and E' apply for high and low speed driving respectively when the vehicle is moving downhill. A broken line F indicates the relationship achieved by a conventional hydraulic power steering control system.

When the vehicle speed is zero, a control signal having a maximum level is applied to the coil 80b of the solenoid 80 so that the plunger 80a protrudes to its maximum extent. In this condition, the valve spool 70 is moved to a position in which the slots 70d are completely covered. Accordingly, hydraulic fluid under pressure in the main port 62 is prevented from flowing to the drain 66. Thus, the pressure of the hydraulic fluid in the first or second power chamber 18 or 20 is substantially that of the fluid in the source 30.

As the vehicle speed increases, the level of the control signal decreases as shown in FIG. 3, and the plunger 80a of the solenoid 80 is caused to move leftward as viewed in FIG. 1, thereby uncovering and increasing the effective cross-sectional area of the slots 7d. In this situation, hydraulic fluid from the main port 62 flows through the slots 70d and the drain 66, from which the hydraulic fluid is discharged to the reservoir 32. Thus, the hydraulic fluid in the first or second power chamber is decreased below the level of fluid in the source 30, and the power assistance force is reduced so that more driver effort is required to steer and oversteering is eliminated.

Upon further increase in the vehicle speed, the steering reaction will vary in a manner as shown by the curve D in FIG. 4. As is clear from FIG. 3, the means 82 causes the pressure of fluid in the chamber 14 to drop below that in the source 30 when the level of at least one of the first and second electrical signals is below a first and a second predetermined value respectively.

It will now be understood from the foregoing description that a hydraulic fluid pressure control valve of the present invention is capable of providing ease and reliability of power-assisted steering under all driving conditions in a simplified manner.

What is claimed is:

1. A power-assisted steering control system for a motor vehicle having a source of pressurized fluid and a fluid reservoir and comprising:

a steering gear defining therein a chamber;

at least one fluid operated steering assistance actuator operatively disposed in said chamber and separating said chamber into first and second chambers;

a valve to selectively connect either one of said first and second chambers with said source of pressurized fluid;

a fluid pressure control valve selectively connecting either one of said first and second chambers with said fluid reservoir and having therein a movable flow control member to control the amount of the fluid flow flowing from said either one of said first and second chambers into said fluid reservoir; and an electrical actuator responsive to signals indicative of at least one of the vehicle speed and the gradient of the road surface on which the vehicle is driven and having a mechanical actuating member operatively connected with said movable flow control member, said mechanical actuating member being moved substantially proportionally to the degree of at least one of the vehicle speed and the gradient.

2. A system as claimed in claim 1, in which said electrical actuator further includes a vehicle speed sensor and a road gradient sensor to respectively sense the vehicle speed and road gradient and generate a first and a second electrical signal respectively analogous thereto, and electrical computing means responsive to said first and second electrical signals and being operative to control said mechanical actuating member in response thereto.

3. A system as claimed in claim 2, in which said electrical computing means controls said mechanical actuating member to reduce the pressure of fluid in said chamber to a level below that of fluid in said source when the level of at least one of said first and second electrical signals is below a first and a second predetermined value respectively.

4. A system as claimed in claim 3, in which said fluid pressure control valve further comprises a check valve to permit flow of fluid through said fluid pressure control valve only in a direction from said chamber to said fluid reservoir.

5. A system as claimed in claim 4, in which said fluid pressure control valve further includes damping means for said movable flow control member.

* * * * *